Dec. 27, 1966  J. L. GOUGER  3,294,056
WARNING DEVICE FOR VEHICLES
Filed Oct. 15, 1964
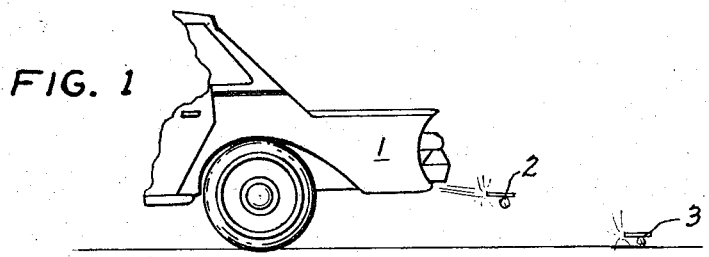
FIG. 1
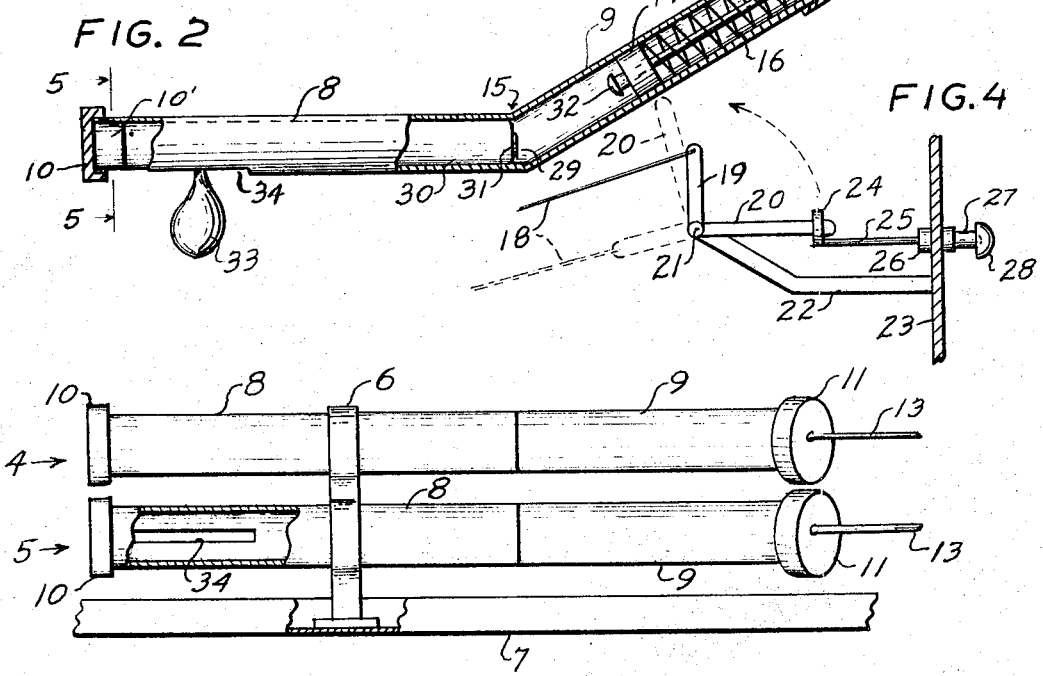
FIG. 2
FIG. 4
FIG. 3
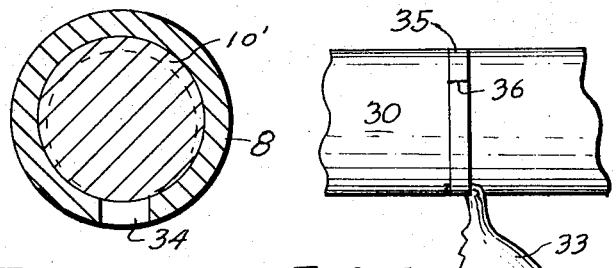
FIG. 5  FIG. 6
JOSEPH L. GOUGER
INVENTOR.
BY *Earl E. Moore*
ATTY.

3,294,056
WARNING DEVICE FOR VEHICLES
Joseph L. Gouger, 920 S. Oakland St.,
Ontario, Calif. 91761
Filed Oct. 15, 1964, Ser. No. 404,083
3 Claims. (Cl. 116—28)

This invention relates to means and ways of warning automobile drivers upon a highway that an accident has occurred or is about to occur. Without sufficient warning, accidents are often worsened and the injury and death toll made greater. A timely warning to other drivers can save lives and especially is this true during stormy periods and foggy periods and especially at night.

The means of warning highway drivers must be easily and quickly operable in that time may be very short to give any warning whatsoever. Unless the warning signal can be executed just before or immediately after an accident, other cars are apt to be involved in an accident or highway block. The device of this invention is a means to avoid accidents as well as a means to held mitigate damages should an accident occur.

One of the principal objects of this invention is to present a warning device that is operable upon short notice and which is dependable in operation.

Another object is to provide a flare type of warning means that can be shot from a vehicle and which will emit a bright warning light for a number of minutes.

A still further object is to provide a flare ejector device for automobiles and the like that gives a warning to traffic on a highway that there is danger in the area ahead and which device is simple in construction, easy to operate and dependable for service.

And a further object is to present a new and novel means for ejecting flares that is economical to make and manufacture and which can be sold at a low price.

In the drawings:

FIG. 1 is an elevational view of the rear portion of an automobile showing same with ejected flares therefrom;

FIG. 2 is an elevational view, partly in sectional view, showing a device for ejecting flares;

FIG. 3 is a plan view of that shown in FIG. 2;

FIG. 4 is an elevational view, partly in sectional view, showing a control device at the dashboard of an automobile which is connected with the ejector device;

FIG. 5 is an enlarged sectional view taken along the line 5—5 of FIG. 2;

FIG. 6 is an enlarged elevational view of a portion of a flare with a weighted bag attached thereto.

A preferred form of the invention is illustrated in the drawings wherein the reference character 1 indicates the rear of an automobile and the numerals 2 and 3 indicate a pair of flares. The flares are shown as ejected from the automobile and they are afire and burn with a bright red light or other color if desired.

The flare ejector of this invention may be attached to any convenient portion of a passenger automobile, truck, boat or even an airplane. The attachment should be in such a manner that the device can shoot onto the roadway (if an automobile) or lanes of travel one or two or more lighted flares. In this particular illustration, two flare ejectors are shown and numbered 4 and 5. One or more brackets or the like 6 are firmly fixed to the ejectors and then they are welded, brazed or otherwise attached to the web portion of the channel means 7 along one side of the frame or chassis of the automobile, truck, bus, tractor, trailer or other kind of vehicle.

Each ejector includes an elongated tube or hollow housing means having a rear portion 8 and an inclined portion 9. A removable cap or plug means 10 closes one end of the tube and another cap 11 closes the other end. The cap 11 has the central bore 12 which provides a bearing means for a piston-like rod 13. The inner end of this rod has fixed thereto, as by threaded means or otherwise, a piston or slider 14 and this piston or slider is constantly urged toward the tubular joint 15 by a strong coiled compression spring means 16. The other end of the rod 13 has a loop 17 to which is attached one end of a flexible cable as indicated at 18.

The other end of cable 18 is attached to the end of an arm 19 which is part of a bell-crank means having another arm 20, as shown. This crank means is pivoted at 21 to the distal end of an offset bracket means 22 that is attached in any suitable manner to the dashboard 23 of a vehicle. To prevent release of the crank there is a loop element 24 that surrounds the distal end of arm 20 and this loop is or can be shifted by a pull rod 25 that is fixed thereto. This rod passes through the dashboard by means of a bearing member 26. On the opposite side of the dashboard the rod 25 has fixed thereto the stop sleeve 27 which is integral with a hand operative knob means 28.

When the knob 28 is pulled by the operator's hand, the loop 24 is slipped from the arm 20 and this action releases the crank to free the cable 18 and hence the piston 14. Thus the spring will cause the piston to shoot toward the tubular joint area 29. Within the tube 8 there is a flare 30 having a firing end means 31. Attached to the piston 14 there is a scratch type abrasive firing projection means 32 which can set the flare afire when it contacts the means 31 with sufficient friction. The flare is of the common variety now well known to vehicle operators and to railroad men. The tube 9 is set at an angle with respect to tube 8 so that the friction scratch means 32 can strike the firing means 31 at a proper angle so as to cause more than enough friction between the two elements 31 and 32 so that the element 31 will be ignited and the flare set-off. This action generates enough heat to dependably set-off the flare and by test this has been proven to be so. When the flare is set-off, the thrust on the flare by the piston will eject the flare from the tube 8 by first knocking off the cap 10. The spring 16 is made strong enough to reliably perform all the necessary functions mentioned.

So that the flare will not roll from the roadway when once cast thereto, a sand bag 33 is attached to the flare and rides along with it from the tube. An open ended slot 34 is provided in each tube 8 to accommodate the neck portion of the sand bag so that they easily travel together from the tube to the surface of the roadway.

The neck portion of the bag 33 is held to the flare by means of a tight band of metal as shown at 35. The metal band or strap is tightly wound about the flare and over a portion of the bag and the overlapped portion of the band soldered or otherwise fixed to itself as indicated at 36. There is sufficient spacing between the flare and the tube so that there will be no danger of binding.

It should now be apparent that this invention serves a useful purpose. When vehicles are so equipped, many accidents along the highways will not become major disasters. In consideration of the importance of such warning devices, the cost of same would be small. Perhaps in time, all States by law will require that all vehicles be equipped with such safety means.

Certain novel features and details of this invention are disclosed herein, and in some cases in considerable detail, in order to make the invention clear in at least one form thereof. However, it is to be clearly understood that the invention, as disclosed, is not necessarily limited to the exact form and details disclosed since it is apparent that various modifications and changes may be made without departing from the spirit and scope of the invention.

Having thus described my invention, what is claimed as new and desired to be secured by Letters Patent is:

1. A device adapted to be attached to a vehicle for warning highway vehicles of impending danger; the device consisting of a tubular housing having a first end portion which is substantially parallel with a roadway and which is secured to an under portion of a vehicle, a second end portion joined to the first end portion and extending therefrom at an angle, the distal end of the first end portion having an opening through which a flare can be discharged, a distal portion of the second end portion having a coiled spring therein, the distal end of the second end portion having a closure means against which one end of the spring rests, a piston-like means at the other end of the spring, a rod attached to the piston-like means which extends through the convolutes of the spring and exits through the closure means for attachment to a remote control means so that the spring can be compressed and released, a flare in the first end portion having a firing means that can be set-off by friction at its end which faces toward the spring, the piston-like means having a friction means on a part thereof facing toward the flare so that when the piston-like means is released after the spring is compressed, the friction means strikes the firing means of the flare to cause the flare to ignite as it is ejected from the first portion of the tubular housing onto a roadway.

2. The device recited in claim 1 wherein the under portion of the first end portion is slotted and which slot is open at the distal end thereof, a weight means outside of the tubular housing and having a part thereof extending through the slot and fixed to a portion of the flare and which weight means is ejected with the flare to prevent its rolling along the roadway.

3. The device recited in claim 1 wherein the opening at the end of the first end portion is provided with a cap means which is removed by the flare when it is ejected.

References Cited by the Examiner
UNITED STATES PATENTS

| | | | |
|---|---|---|---|
| 1,289,622 | 12/1918 | Blackshear | 124—34 |
| 1,673,945 | 6/1928 | Littlefield | 124—26 |
| 2,620,763 | 12/1952 | Smith et al. | 116—65 |
| 2,751,582 | 6/1956 | Kuykendall | 116—63 |
| 2,751,711 | 6/1956 | Greenwood | 46—199 |
| 2,789,501 | 4/1957 | Sawicki | 102—37.8 |
| 3,016,969 | 1/1962 | Devontier | 116—114 |
| 3,055,269 | 9/1962 | Clarke et al. | 86—1.5 |

LOUIS J. CAPOZI, *Primary Examiner.*